United States Patent

Doyen et al.

[11] Patent Number: 5,995,906
[45] Date of Patent: Nov. 30, 1999

[54] METHOD FOR RECONCILING DATA AT SEISMIC AND WELL-LOG SCALES IN 3-D EARTH MODELING

[75] Inventors: Philippe Marie Doyen, Esher; David Edgar Psaila, London, both of United Kingdom

[73] Assignee: Western Atlas International, Inc., Houston, Tex.

[21] Appl. No.: 08/943,577

[22] Filed: Oct. 3, 1997

[51] Int. Cl.[6] .................................................. G06F 19/00
[52] U.S. Cl. ................................................................ 702/16
[58] Field of Search .................................. 702/16, 5, 12, 702/14, 11, 13; 367/72, 73

[56] References Cited

U.S. PATENT DOCUMENTS 5,416,750  5/1995  Doyen et al. ............................. 367/73
5,838,634  11/1998  Jones et al. ................................ 702/12

OTHER PUBLICATIONS

Creating 3–Dimensional Reservoir Models Using Areal Geostatistical Techniques Combined with Vertical Well Data, SPE 29670, Sheldon B. Gorell, Western Atlas Software.

Geostatistical Reservoir Modeling Accounting for Precision and Scale of Seismic Data, SPE 36497; C.V. Deutsch, S. Srinivasan, Y. Mo; Prepared for and Presented at 1996 SPE Annual Technical Conference and Exhibition, Denver, Colorado; Oct. 1996.

Incorporating Seismic Attribute Maps in 3D Reservoir Models, SPE 36499; Ronald A. Behrens, Mark K. Macleod, Thomas T. Tran, Abiodun O. ALIMI; Prepared for and Presented at 1996 SPE Annual Technical Conference and Exhibition, Denver, Colorado; Oct. 1996.

Reservoir Characterization by Seismically Constrained Stochastic Simulation; SPE 25656; C.S. Burns, D. Cooper, L. Den Boer, P. Doyen, T. Smart; Prepared for and Presented at 8th Annual Middle East Oil Show of the Society of Petroleium Enginers, Bahrain, Apr. 1993.

Primary Examiner—Donald E. McElheny, Jr.

[57] ABSTRACT

A geostatisical method for reconciling the disparity in scale between vertically detailed log measurements of a selected rock property in boreholes and vertically-averaged measurements of the same rock property as derived from seismic observations over a region of interest.

2 Claims, 3 Drawing Sheets

METHOD FOR RECONCILING DATA AT SEISMIC AND WELL-LOG SCALES IN 3-D EARTH MODELING

BACKGROUND OF THE INVENTION

1. Field of the Invention

A statistical method for explicitly accounting for the difference in vertical scale between 3-D seismic data and stratigraphic measurements made using logging tools.

2. Discussion of Related Art

As is well known to geophysicists, a sound source, at or near the surface of the earth, is caused periodically to inject an acoustic wavefield into the earth at each of a plurality of regularly-spaced survey stations. The wavefield radiates in all directions to insonify the subsurface earth formations whence it is reflected back to be received by seismic sensors (receivers) located at designated stations at or near the surface of the earth. The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later analytic processing. The travel-time lapse between the emission of a wavefield by a source and the reception of the resulting sequence of reflected wavefields by a receiver, is a measure of the depths of the respective earth formations from which the wavefield was reflected. Certain attributes of the signals such as signal amplitude level and frequency may be related to the type of rock through which the wavefield propagated or from which the wavefield was reflected.

The seismic survey stations of a 3-D survey are preferably distributed in a regular grid over an area of interest with inter-station spacings on the order of 25 meters. The processed seismic data associated with a plurality of seismic traces from a plurality of receivers distributed over an area under survey may be formatted by well-known analytic methods to create a model of a volume of the earth. The model may be structural, showing the physical attitudes of the respective earth strata of an entire geologic sequence such as depth, dip and strike. Alternately the model may be designed to exhibit variations in the level of a selected seismic attribute, such as seismic impedance. Seismic impedance may be statistically related to variations in the texture of some physical property of subsurface rocks such as porosity or lithology. The purpose of such earth models is to select optimal locations for boreholes drilled to recover some desired natural resource such as fluid hydrocarbon products.

A detailed picture of the stratigraphy of the vertical geologic column at a wellsite can be provided by one or more logging tools of any one of many different known types, that may be lowered into a borehole on a wireline, on the drill stem in MWD operations or on coiled tubing. The vertical measurement resolution of wireline tools is very good; it may be on the order of centimeters or often, even millimeters. Horizontally, boreholes are far apart, particularly in newly-developed prospects; the well spacing may be hundreds or more meters. For that reason, the horizontal resolution of log data measurements is very poor.

In a 3-dimensional areal seismic survey, the seismic stations are closely-spaced horizontally, perhaps on the order of 25 meters or less, thus providing excellent lateral resolution. But the vertical, time-scale resolution of seismic data is a function of the frequency of the reflected seismic energy and the wavefield propagation velocity. The vertical resolution of typical low-frequency reflected seismic signals, after processing, may be on the order of tens of meters.

It is useful to statistically relate the laterally sparsely-sampled but vertically detailed borehole measurements of selected rock characteristics with seismic observations which are densely spaced horizontally but poorly resolved vertically. In view of the limited vertical resolution of seismic measurements, seismic attributes are typically correlated with petrophysical well data averaged vertically across earth strata which may be several tens of meters thick. The seismic attributes are then used to guide the areal interpolation of the well-derived zone average data. The techniques of kriging and cokriging are commonly-used geostatistical methods for performing this interpolation task. Kriging is a spatial prediction method for generating the best linear unbiased estimate of a rock property value by statistical interpolation of well data. Cokriging is a spatial prediction method using seismic attributes as secondary data to guide the interpolation of the average rock characteristic measured in wells. Both methods are analogous to Wiener filtering techniques applied in the time domain.

The cokriging method is useful to derive an areal model of an average rock property for a given earth stratum by combining well and seismic data. However, this and other similar techniques do not provide a vertically detailed 3-D model of the subsurface layer. There is a need for constructing such detailed 3-D models from seismic and well log data. Three-dimensional modeling requires careful integration of log and seismic data at different scales. A review of prior integration efforts follows.

S. B. Gorell, in a paper entitled Creating 3-D reservoir models using areal geostatistical techniques combined with vertical well data, 1995, SPE paper 29670, presented at the Western Regional Meeting at Bakersfield, Calif., and C. S. Burns et al. in a paper entitled Reservoir characterization by seismically constrained stochastic simulation, 1993, SPE paper 25656, 8th annual Middle East Oil show, Bahrain, propose an empirical scaling method. Here, each vertical column of cells in a 3-D porosity model is linearly re-scaled to reproduce a seismic derived average porosity map. The technique has the advantage of being straightforward to implement but the re-scaled 3-D model will not tie at deviated wells. Furthermore, the rescaling process may distort the data histogram.

C. V. Deutsch et al, in Geostatistical reservoir modeling accounting for precision and scale of seismic data, 1996, SPE paper 36497, Annual Technology Conference, Denver. Colo., introduced an heuristic procedure based on simulated annealing. An objective function was constructed including a term that measures the degree of misfit between vertical average data and average values computed from the 3-D model. Simulated annealing is used to perturb the 3-D model until the misfit is reduced to a value below a specified tolerance. The method has the advantage that is it possible to account for the precision of the average information. The method is, however, very greedy of computer time and suffers from convergence problems when conflicting constraints are present in the objective function.

R. A. Behrens et al. in 1996, also at Denver, in SPE paper 36499 entitled Incorporating seismic attribute maps in 3-D reservoir models, teach a sequential simulation technique based on conventional block kriging. A porosity estimate is obtained for each cell of a 3-D model as a weighted linear combination of adjacent cell porosity data and the seismic derived porosity average of the vertical column containing the cell. The method accounts explicitly for the difference of support volumes between well and seismic data but not for the fact that the seismic porosity averages may not be exact measurements. Compared to simulated annealing, this method has the advantage of being more robust and amenable to analytical analysis. But it involves solving relatively complex kriging systems constructed from average covariance functions.

There is a need for a 3-D simulation method that will account for the difference in scale between seismic and logging data and which will be economical of computer processing time. This disclosure teaches a stochastic interpolation method which may be used to generate a vertically detailed 3-D earth model of a rock characteristic by combining finely-sampled log data with seismic attributes representing vertical average of the rock property of interest.

SUMMARY OF THE INVENTION

A computer-aided geostatistical method for simulating, from seismic data, the spatial distribution of a designated rock property over a three-dimensional (3-D) array of cells. The array represents a discretized model of a subsurface earth layer wherein the vertical cell thickness is substantially less than the vertical resolution of the seismic data. A first set of log derived measurements of the designated rock property, made at control cells along well trajectories, is assembled in a programmed computer. A second set of measurements is assembled in said programmed computer corresponding to seismically-derived, vertical average values of the same rock property at each vertical column of the cells in the model. A cell to be simulated is randomly selected from the 3-D array. A search region is defined, centered around the cell to be simulated. The kriging estimate and variance of the rock property is calculated at the chosen cell from the rock property values at control cells located within the search region. The most likely rock property value is determined at the cell based on the measured vertical average for the column containing the cell and the rock property values at control cells in the same column. The variance of the Gaussian likelihood function is calculated at the cell under consideration. Thereafter, the mean of the Gaussian posterior probability distribution is determined for that cell as a weighted linear combination of the previously-derived kriging and maximum likelihood estimates. The variance of the posterior distribution is now calculated from the kriging variance and the variance of the likelihood function. A simulated rock property is generated at the cell by sampling at random from the posterior probability distribution. The simulated rock property is entered into the array as an additional control cell. The entire process is repeated until all cells in the array have been simulated. Thereupon, with the aid of a computer graphics program, the distribution of the simulated rock property is mapped over the 3-D array cells.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

A discretized earth model is defined as a 3-D array of cells. Each cell is indexed by an integer, i. The vertical thickness of each cell is assumed to be much smaller than the vertical resolution of surface seismic data. Please refer now to FIG. 1 which represents a vertical section through the discretized earth model, generally shown as 10.

A rock property variable $x_i$ is defined in each cell, representing for example, porosity. After suitable transformation, the variables $x_i$ are assumed to belong to a second-order, stationary multi-Gaussian random field with constant zero mean:

$$E\{x_i\}=0, \qquad (1)$$

variance $\tau^2_x$, and spatial co-variance $$E\{x_i x_j\}=C_{ij} \qquad (2)$$

where Cij is a function of the interdistance vector between cells i and j. The cells in the earth model are assumed to have quasi point support, meaning that the co-variances in (2) are point-to-point values as taught by to U.S. Pat. No. 5,416, 750, issued May 16, 1995 to P. M. Doyen et al., and which is incorporated herein by reference.

Figure 1:
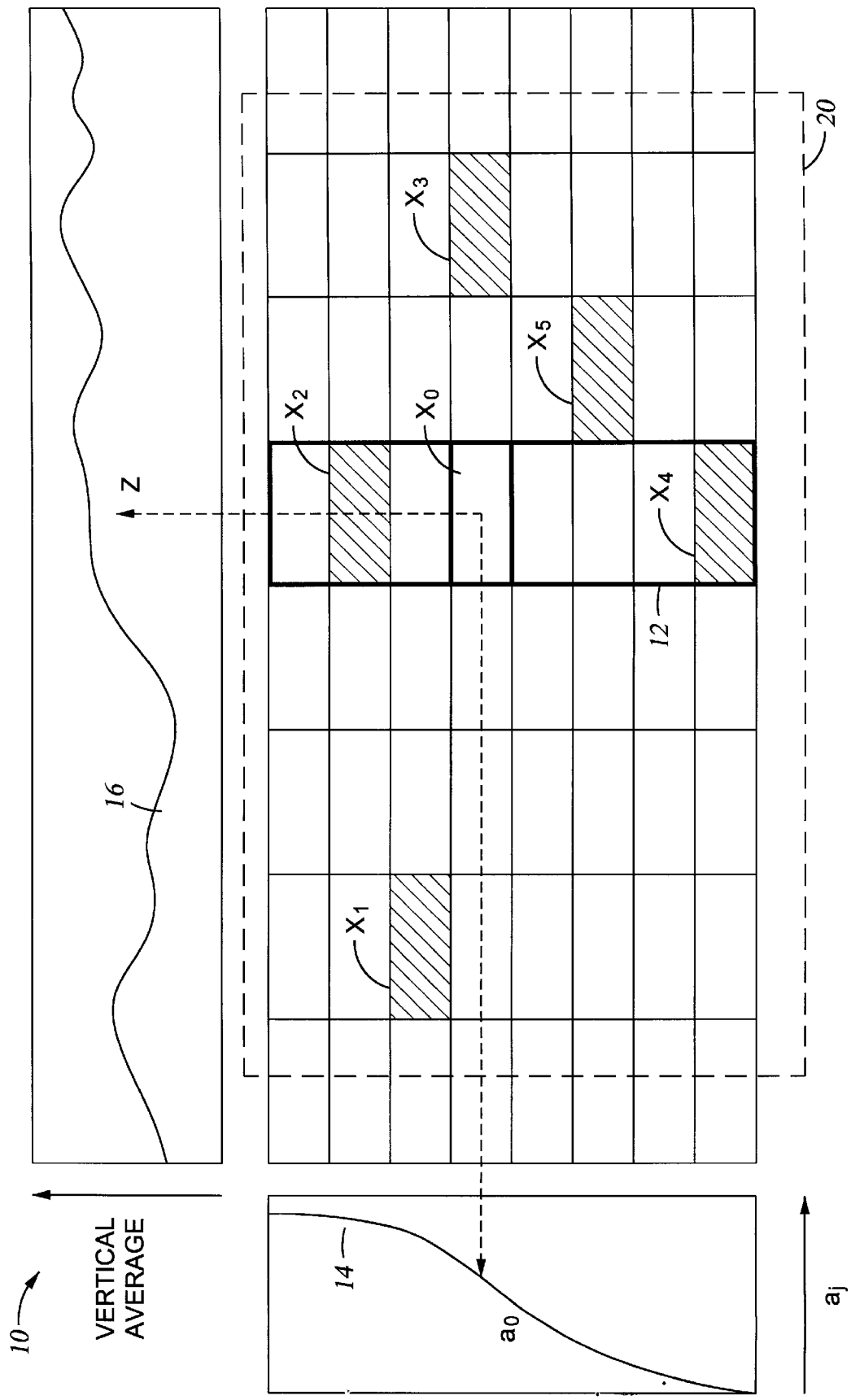
FIG. 1 is a schematic vertical section through a proposed 3-D earth model.

As shown in FIG. 1, let $x_0$ represent the rock property value to be simulated at current cell 0. Let z represent the seismic-derived vertical average rock property of the column of cells, 12, containing cell 0. The simulations must be constrained to reproduce the vertical average with a tolerance $\epsilon$; that is, $$z=\epsilon_j a_j x_j + \epsilon \qquad (3)$$

where the sum is over all cells in the column containing cell 0 and the $x_j$ represent the simulated cell values. In (3), the coefficients $a_j$ represent user-specified averaging weights which may vary vertically from cell to cell as shown by graph 14 to the left side of FIG. 1. In (3), the error in each column, $\epsilon$, is modeled as a realization of a Gaussian white noise with zero mean and constant variance $\tau^2_\epsilon$. The variation of the seismically derived average, z, from column to column is shown by graph 16 above the earth model 10 in FIG. 1.

A simulated value for $x_0$ is obtained by sampling at random from the local posterior distribution $$p(x_0|x_s, z) \qquad (4)$$

where $x_s$ represents well measurements or previously simulated values at the set of cells as located within the search neighborhood 20 around randomly-selected cell 0. In FIG. 1, set s is equal to $\{1,2,3,4,5\}$. Sequential sampling of the conditional distribution (4) at all cells generates a simulated earth model constrained by the well data and the vertical averages. Ignoring terms which are not independent of $x_0$ and therefore not required in the sampling, (4) may be rewritten as $$p(x_0|x_s, z) \, p(x_0|x_s) \, f(i \, z|x_c,x_0) \qquad (5)$$

where the Markov-type assumption has been made that $$f(z|x_s, x_0)=f(z|x_c,x_0),$$

with c the subset of s corresponding to conditioning cells in the vertical column containing cell 0. In FIG. 1, subset c={2, 4}. This Markov assumption means that the conditional distribution of the column-average variable, z, depends only on cell values belonging to the column and not on the other cells. This is an approximation similar to that made in collocated cokriging.

When viewed as a function of $x_0$ for a given vertical average value z and fixed $x_c$, $l(x_0)=f(z|x_c, x_0)$ is defined as the likelihood function. The Bayesian updating rule (5) merely states that the posterior distribution in one cell is obtained by taking the product of the likelihood function, controlling the contribution of the seismic average information, and the conditional distribution of $p(x_0|x_s)$, representing the influence of the previously simulated and original cell data. Compared to the likelihood function corresponding to collocated cokriging, it is worth emphasizing that the seismic average likelihood function introduced here depends on previously simulated rock properties in the column containing the currently simulated cell. It follows from our Gaussian assumption, that the first term in (5) is a Gaussian distribution given by $$p(x_0 \mid x_s) \propto \exp\left(-\frac{[x_0 - x_0^{SK}]^2}{2\sigma_{SK}^2}\right) \quad (6)$$

with mean $x_0^{SK}$ equal to the simple kriging estimate of $x_0$ and variance $\tau^2_{SK}$ equal to the corresponding kriging estimation variance, the kriging being performed using $x_s$ as conditioning data.

In (3), the variable z was defined as the weighted sum of the variables in one column of the earth model. Ignoring the vertical correlation between the variables x in a column, it can be shown that the likelihood function $l(x_0)$ is also a Gaussian kernel with mean given by $$x_0^{ML} \approx \left(z - \sum_{j \in c} a_j x_j\right)/a_0 \quad (7)$$

and variance given by $$\sigma_{ML}^2 \approx \left(\sigma_\epsilon^2 + \sigma_x^2 \sum_{j \notin c+0} a_j^2\right)/a_0^2 \quad (8)$$

In (7), $x_0^{ML}$ may be interpreted as the Maximum Likelihood estimate of $x_0$ based on the measured vertical column average z and the weighted sum of all previously simulated values in the column $x_j$, j∈c. In (8), the summation is over all cells not yet simulated in the column containing cell 0.

Under the multi-Gaussian assumption, the local posterior distribution in (5) is also a normal distribution. This can be verified by observing that (5) is the product of two exponential kernels whose exponents are quadratic functions of $x_0$. The product is therefore an exponential with an exponent quadratic in $x_0$, defining a Gaussian posterior distribution whose mean and variance can be shown to be $$m_0 = \frac{x_0^{SK} \sigma_{ML}^2 + x_0^{ML} \sigma_{SK}^2}{\sigma_{ML}^2 + \sigma_{SK}^2} \quad (9)$$

and $$\sigma_0^2 = \sigma_{SK}^2 \frac{\sigma_{ML}^2}{\sigma_{ML}^2 + \sigma_{SK}^2} \quad (10)$$

Figure 2:
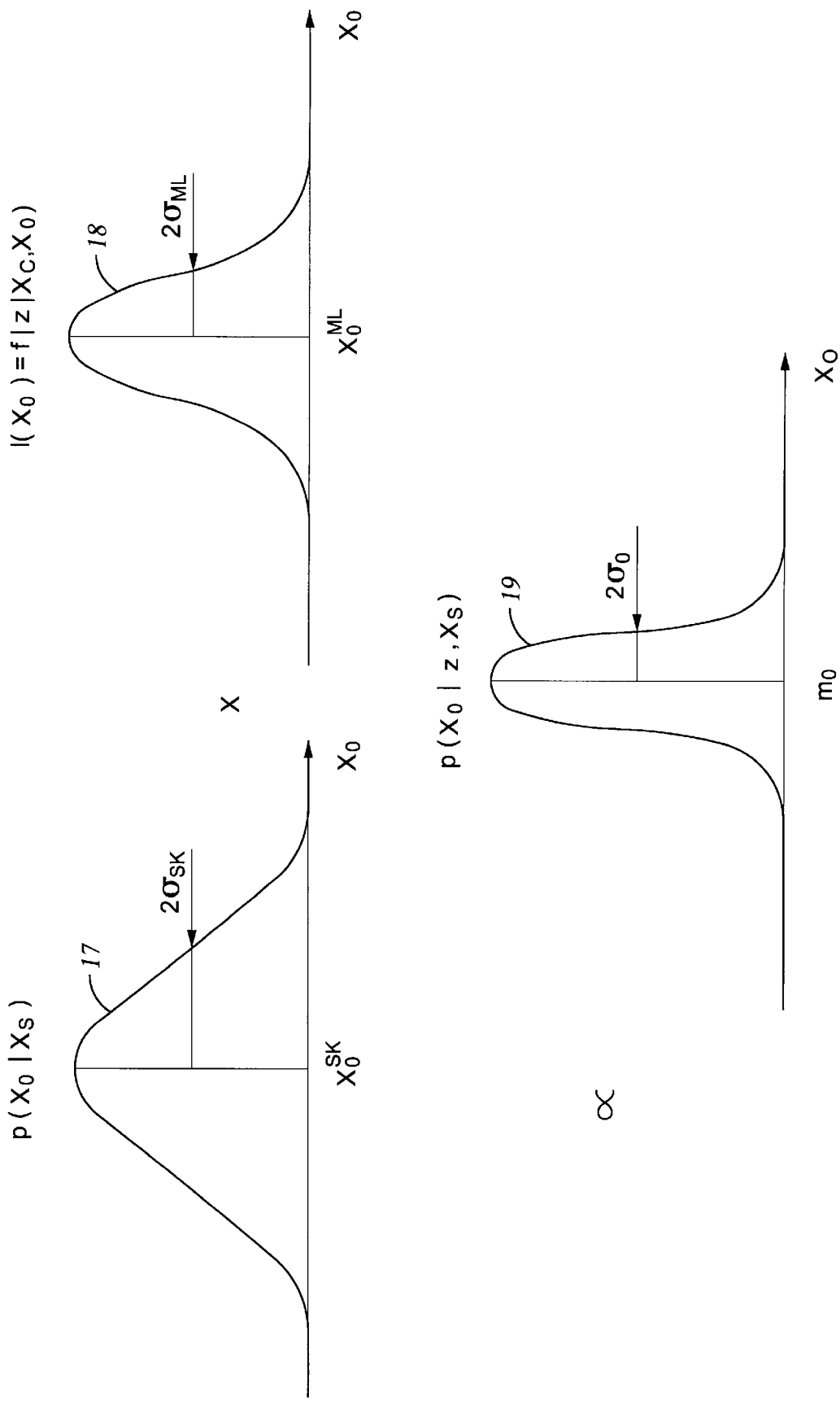
FIG. 2 is a graphic illustration of equation (5)

A graphic illustration of the process for obtaining the posterior distribution as the product of the Gaussian likelihood function and the Gaussian, kriging-based distribution is shown by curves 17, 18 and 19 in FIG. 2.

Figure 3:
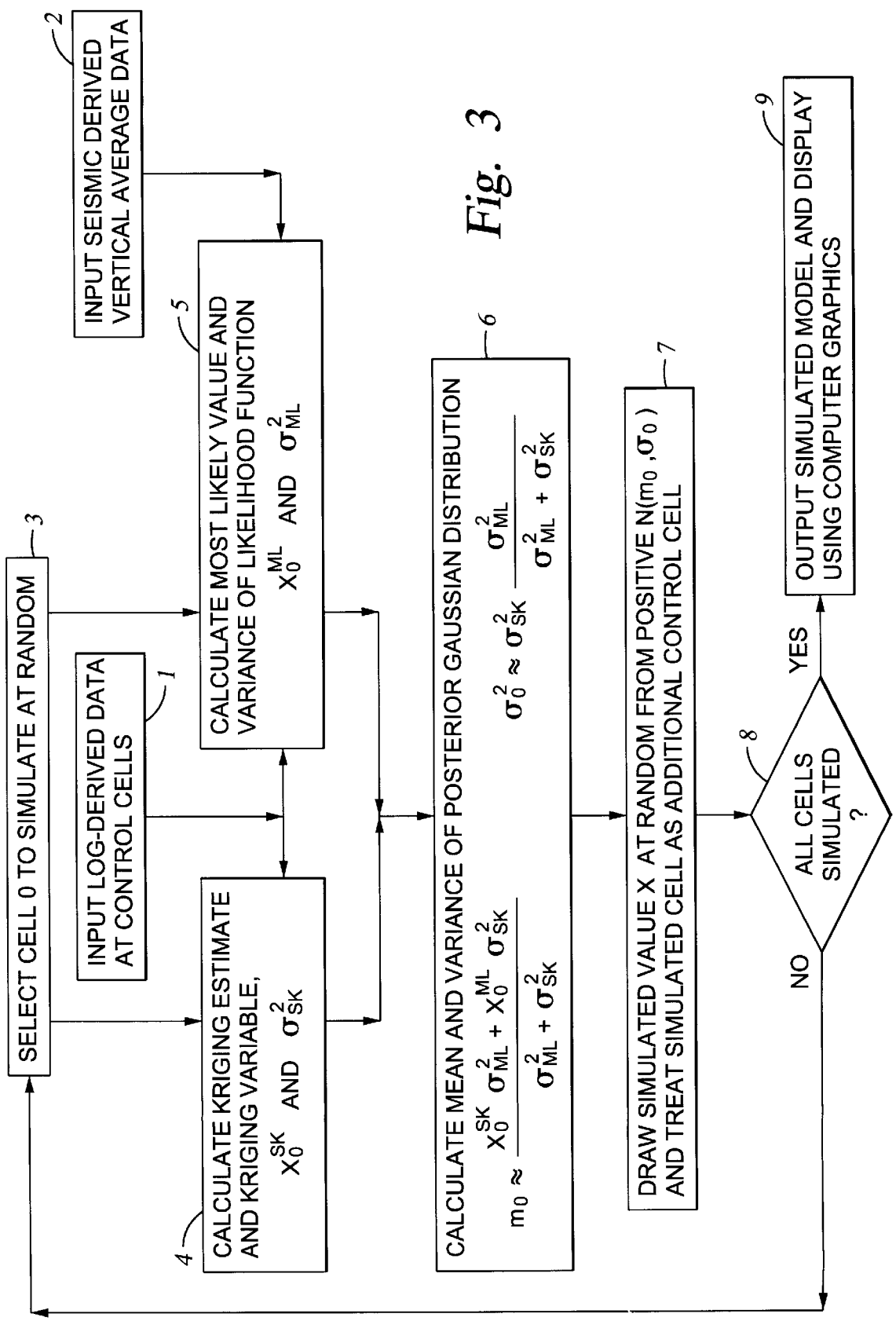
FIG. 3 is a flow diagram illustrating the best method of operation.

The best mode of using this invention, based on formulas (9) and (10) as presently contemplated is best shown by means of a flow diagram as illustrated in FIG. 3:

Step 1. Assemble, in a programmed computer, log-derived data at control cells corresponding to well locations.

Step 2. Assemble seismically-derived vertical average data for all columns of the 3-D array of cells.

Step 3. Select at random, a cell, 0, to be simulated.

Step 4. Calculate $x_0^{SK}$ and $\tau^2_{SK}$ by point kriging using the data $x_s$ which correspond to all original and previously simulated data at control cells falling within a specified search region.

Step 5. Calculate the most likely value $x_0^{ML}$ and the variance of the Gaussian likelihood function $\tau^2_{ML}$, according to formulas (7) and (8).

Step 6. Using equations (9) and (10) and the results of steps 4 and 5, calculate the mean $m_0$ and variance $\tau_0^2$ of the Gaussian posterior distribution.

Step 7. Obtain the simulated value $x_0$ by sampling at random from the Gaussian distribution $N(m_0, \tau^2_0)$ and consider the simulated cell value to be an additional control cell.

Step 8. Iteratively return to step 3 until all cells in the 3-D grid have been simulated.

Step 9. When all cells have been simulated, map and display a tangible simulated global model with the aid of any well-known computer graphics program.

Computer implementation of the simulation process with vertical average constraints as described above is particularly simple and efficient as it does not require any block kriging calculations. All that is required is a straightforward modification of the classical Gaussian simulation process to perform the Bayesian updating of the kriging mean and variance according to formulas (9) and (10). The impact of the average data is easy to understand thanks to the decoupling of the influences of point data and column average data.

Following are some important properties of the simulation procedure:

The mean of the posterior distribution in (9) is a linear combination of point kriging estimate $x_0^{SK}$ of the cell value and the maximum likelihood estimate $x_0^{ML}$ based on the vertical column average and the previously simulated cell values in the column.

The simulations tie at the wells. This follows from the exactitude property of kriging, and the fact that (9) and (10) reduce to $m_0 = x_0^{SK}$ and $\tau_0^2 = 0$ at cells corresponding to well data.

The simulated earth models approximately reproduce the vertical column averages with a tolerance depending upon the value of the noise variance $\tau_\epsilon^2$. In particular, the vertical column average data are reproduced exactly when the noise variance is zero. This results from the fact that $\tau^2_{ML} = \tau_0^2 = 0$ when the last cell in a column is simulated and the noise variance is zero. From (7) and (9), the last simulated value $x_0$ is determined from the equation $m_0 = x_0^{ML} = (z - \epsilon a_j x_j)/a_0$, where the sum is over all cells in the column except the last to be simulated. In practice, exact reproduction of seismic-derived column averages is not desirable and may give rise to abrupt changes in simulated values. A laterally variable tolerance level may even be specified to reflect changes in the accuracy of the seismic average information.

The simulation procedure works for any linear average of the form given in equation (3). We may select equal weights $a_j=1/n$ in equation (3) for a simple arithmetic average. On the other hand, if seismic-derived vertical averages are more sensitive to rock property values near the top of a layer, we may choose weight values which decrease with increasing depth in the layer as shown by graph 14, FIG. 1.

It should be observed that the simulation process reduces to point kriging simulation at vertical levels in the layer where the averaging weights are zero. Thus, when $a_0=0$, (9) and (10) reduce to $m_0=x_0^{SK}$ and $\tau_0^2=\tau_{SK}^2$ respectively.

In arriving at approximations (7) and (8), we have ignored vertical correlation in the calculation of the column average likelihood function. Exact expressions may be obtained by replacing the coefficients a in (7) and (8) by a+$\lambda$ where the $\lambda$ are block kriging weights. When $\tau_\epsilon$ is equal to zero and the vertical averaging weights $a_j$ are constant, the exact solutions are numerically identical to conventional block kriging but are obtained in a simpler manner due to the decoupling between point data and vertical average data.

In practice, experience shows that the approximations (7) and (8) may be applied without adversely affecting vertical continuity on the simulated earth models. This is because the likelihood term is used to modulate the kriging solution which already accounts for vertical continuity.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A computer-aided geostatistical method for simulating, from seismic data, the spatial distribution of a designated continuous rock property over a three-dimensional array of cells, the array representing a discretized model of a subsurface earth layer, the vertical thickness of said cells being substantially less than the vertical resolution of the seismic data, comprising:

a) assembling in a programmed computer including a data processor, a first set of log-derived measurements of the designated rock property made at control cells along well trajectories and a second set of measurements corresponding to seismically-derived, vertical average values of the same rock property at each vertical column of cells;

b) randomly selecting a cell to be simulated from the three-dimensional array and defining a search region around said cell;

c) calculating the kriging estimate and the kriging variance of the rock property value at said cell from the rock property values at control cells located within the search region;

d) determining the most likely rock property value at said cell based on the measured vertical average for the column containing said cell and the rock property values at control cells in the same column;

e) calculating the variance of the Gaussian likelihood function at said cell;

f) calculating the mean of the Gaussian posterior probability distribution at said cell as a weighted linear combination of the kriging estimate and of the maximum likelihood estimate derived in steps c) and d) respectively;

g) calculating the variance of the posterior distribution from the kriging variance and the variance of the likelihood function derived in steps c) and e) respectively;

h) generating a simulated rock property value at said cell by sampling at random from said posterior probability distribution;

i) entering said simulated rock property value in said array to provide an additional control cell;

j) repeating steps b) through i) until all cells in the array have been simulated; and k) with the aid of a computer graphics program, mapping the distribution of the simulated rock property values over the three-dimensional array of cells to provide a tangible global display of the rock property distribution.

2. An article of manufacture comprising:

a global display of a model of the spatial distribution of a simulated continuous rock property value over a region of interest as produced by the process of claim 1.

* * * * *